United States Patent [19]
Berchem

[11] Patent Number: 5,205,533
[45] Date of Patent: Apr. 27, 1993

[54] BALL VALVE

[75] Inventor: Rütger Berchem, Essen, Fed. Rep. of Germany

[73] Assignee: Metalpraecis Berchem + Schaberg Gesellschaft Fur Metallformgebung mbh, Gelsenkirchen, Fed. Rep. of Germany

[21] Appl. No.: 712,124

[22] Filed: Jun. 7, 1991

[30] Foreign Application Priority Data

Jun. 8, 1990 [DE] Fed. Rep. of Germany ....... 9006504

[51] Int. Cl.⁵ .............................................. F16K 47/04
[52] U.S. Cl. .................... 251/118; 251/315; 137/375
[58] Field of Search ................ 137/375; 251/315, 118, 251/314, 306, 207, 208

[56] References Cited

U.S. PATENT DOCUMENTS

| 3,501,128 | 3/1970 | Pool | 251/315 X |
| 4,304,261 | 12/1981 | Forester | 137/613 |
| 4,771,803 | 9/1988 | Berchem et al. | 251/315 X |
| 4,795,133 | 1/1989 | Berchem et al. | 251/315 X |

FOREIGN PATENT DOCUMENTS

| 2732672 | 10/1972 | Fed. Rep. of Germany . |
| 2119357 | 9/1976 | Fed. Rep. of Germany . |
| 223782 | 6/1984 | Fed. Rep. of Germany . |
| 3627328 | 2/1988 | Fed. Rep. of Germany . |
| 3902185 | 8/1989 | Fed. Rep. of Germany . |

Primary Examiner—Alan Cohan
Assistant Examiner—Kevin L. Lee
Attorney, Agent, or Firm—Herbert Dubno; Andrew Wilford

[57] ABSTRACT

A valve has a housing having an inlet connection and an outlet connection and formed with a valve seat having spaced inlet and outlet ports connected to the respective connections and a valve element formed with a throughgoing passage having an upstream end and a downstream end. This valve element fits in the seat and is displaceable therein between an open position with its passage aligned between the respective inlet and outlet ports and a closed position with its passage out of alignment between the ports. The passage is formed upstream of its downstream end and downstream of its upstream end as a restriction and is of larger flow cross section at its downstream end than at the restriction so that on fluid flow through the valve from the inlet to the outlet pressure drops in the passage downstream of the restriction.

5 Claims, 3 Drawing Sheets

BALL VALVE

FIELD OF THE INVENTION

The present invention relates to a valve. More particularly this invention concerns a ball valve.

BACKGROUND OF THE INVENTION

A standard valve or cock of the ball, plug, or slide type has a housing formed on one side with an inlet connection and opposite it on its other side with an outlet connection. These connections open inside the housing at opposite ports in a valve seat on which rides the valve element, the ball, slide, or plug, that itself is formed with a throughgoing passage. In the open position of the valve the valve-element passage is aligned between the two ports for fluid flow therebetween and in the closed position it is not thus aligned so that no fluid can flow between them. At intermediate positions the valve element and the seat at the outlet form a throttling gap that creates turbulence and a pressure drop due to the Carnot effect and that causes erosion of the valve element and/or of the seat, and/or of the outlet connection.

As described in German patent 3,803,417 filed 05 Feb. 1988 it is known to line the passage of the valve element with a wear-resistant material like sintered ceramic. Nevertheless there is erosion at the throttling gap that reduces the service life of the valve if it is used as a throttling-type metering valve.

OBJECTS OF THE INVENTION

It is therefore an object of the present invention to provide an improved valve of the above-described type.

Another object is the provision of such an improved valve of the above-described type which overcomes the above-given disadvantages, that is which does not erode at the critical seat regions.

A further object is an improved ball, plug, or slide valve which can act as a fluid-flow restriction.

SUMMARY OF THE INVENTION

The instant invention is an improvement on a throttle-type metering valve having a housing having an inlet connection and an outlet connection and formed with a valve seat having spaced inlet and outlet ports connected to the respective connections and a valve element formed with a throughgoing passage defined by an inner wall of wear-resistant material and having an upstream end and a downstream end. This valve element fits in the seat and is displaceable therein between an open position with its passage aligned between the respective inlet and outlet ports and a closed position with its passage out of alignment between the ports. The improvement of the invention is that the passage is formed upstream of its downstream end and downstream of its upstream end as a restriction and is of larger flow cross section at its downstream end than at the restriction so that, on fluid flow through the valve from the inlet to the outlet, flow separation from the wall is initiated at the restriction.

The invention is based on the surprising discovery that moving the restriction upstream from the downstream end of the valve-element passage has a very good effect on valve operation. The widening of the flow passage defines the location of flow separation or breakaway of flow. The flow separation from the wall entails a flow-pressure drop known in the art as a Carnot impulse drop. Thus the flow separates from the walls of the passage and flows freely, separate from the static fluid layer on the wall.

According to a feature of the invention the passage has upstream of the restriction a flow cross section that is uniform and that is substantially smaller than the flow cross section downstream of the restriction which is also uniform. It is also possible for the flow cross section of the passage to increase uniformly downstream of the restriction. The angle of increase in flow cross section is sufficient that the desired flow separation is achieved.

In accordance with a further feature of the invention the valve element is provided with structure forming the restriction. This structure can be a washer-like disk set in the valve element between two passage sections of identical shape and cross section. Thus the jet of liquid issuing from the downstream side of this restriction will have no significant erosive effect on the passage downstream. The small-size orifice of this restriction element can also be eccentric to the centerline of the passage.

It is also within the scope of this invention when the flow cross section of the passage increases uniformly in both directions from the restriction. The valve element can be provided with a sintered-ceramic liner forming the passage and restriction and with a retaining ring at the downstream end holding the liner in place in the element. Such a liner can be relatively unpressurized, that is the static pressure of the medium in the flow through the valve is also effective on the outside of the liner sleeves. The material of the retaining ring is determined by the thermal-deformation properties of the basic material of the valve element. Thus the liner is mounted loose in the bore of the valve element, typically as at least two longitudinally abutting pieces. These liners can be either coated with or solid ceramic material.

Not only is the valve according to this invention going to last longer in service due to its increased resistance to erosion, but it also has been surprisingly found to have a broader adjustment range and to generally work better than the prior-art such valves.

BRIEF DESCRIPTION OF THE DRAWING

The above and other objects, features, and advantages will become more readily apparent from the following, reference being made to the accompanying drawing in which.

SPECIFIC DESCRIPTION

Figure 1:
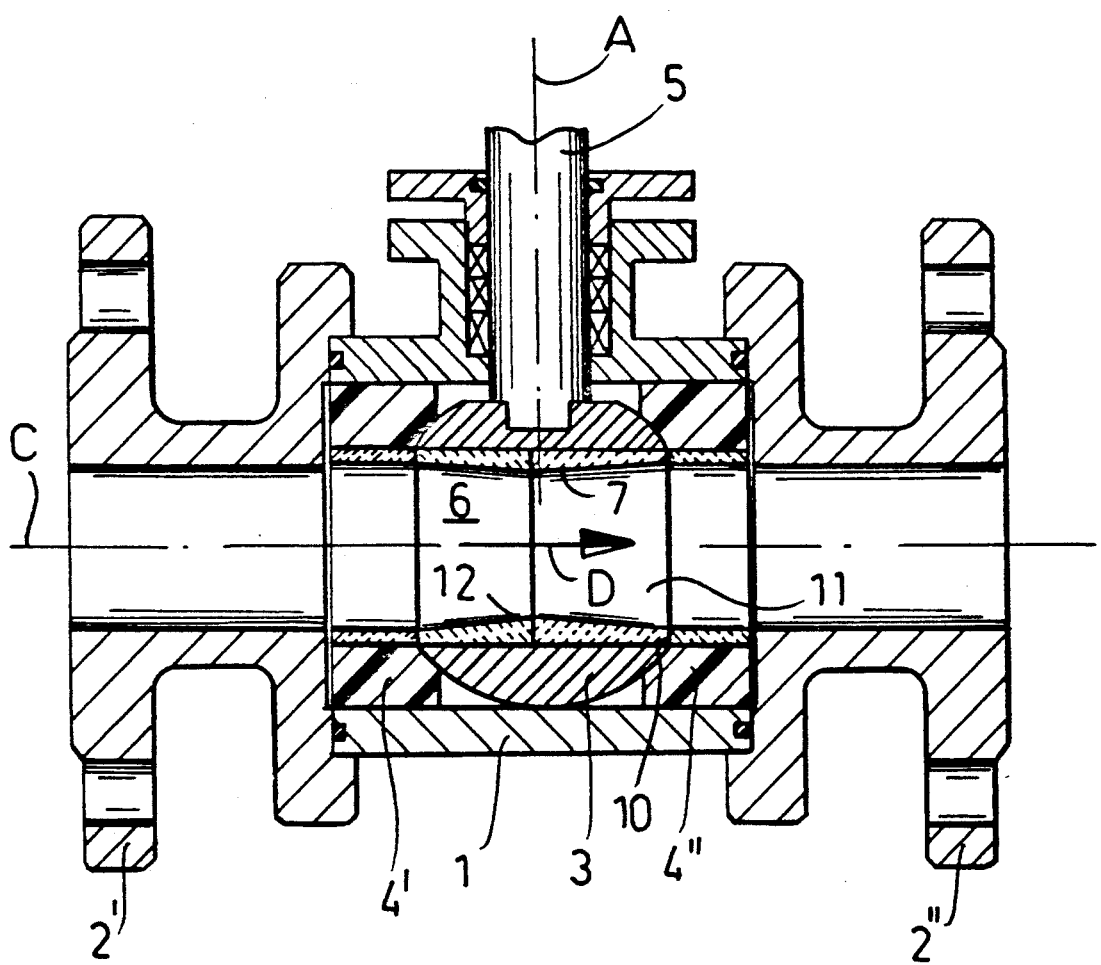
FIG. 1 is an axial section through the valve according to this invention.
Figure 6:
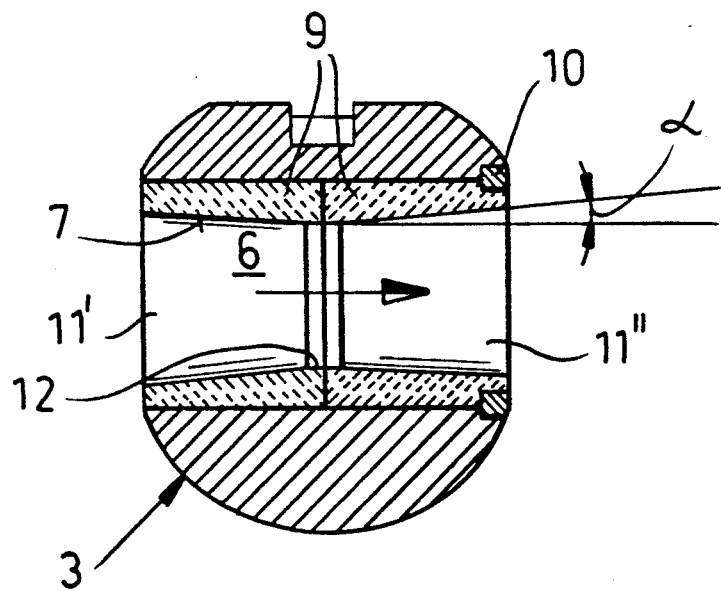
FIG. 6 is a large-scale view of the valve ball of the valve of FIG. 1.

As seen in FIGS. 1 and 6 a valve according to this invention has a housing 1 provided with an upstream inlet connection 2' and a downstream outlet connection 2" forming inlet and outlet ports that are aligned along a common longitudinal centerline C and that both open at respective seats 4' and 4" provided in the housing 1. The seats 4' and 4" are one-piece elements of a sintered ceramic or they each have a passage defined by an inner wall made of such wear-resistant material. A valve element or ball 3 is rotatable about an axis A perpendicular to the centerline C in the housing 1 and is formed with a through-going passage 6 defined by an inner wall 7 of wear-resistant material in turn formed centrally with a restriction 12. Flow through the valve is in the direction indicated by arrow D.

More specifically as seen in FIG. 6 the body 3 is provided with a liner 9 formed of two similar sleeves of sintered ceramic. The passage 6 is in the illustrated open-valve position centered on the line C and flares frustoconically in both directions at 11' and 11" away from the restriction 12 which is a very short cylindrical region also centered on the line C and bisected by the axis A. The flare angle $\alpha$, that is the angle between a side wall and the centerline C, has such a value as to initiate flow separation from the wall downstream of the restriction. The liner is held in place by a snap ring 10 fitted into the downstream end of the valve element 3.

Thus with the system of this invention the increase in flow cross section downstream of the restriction 12 will greatly reduce erosion of the element 3 in the critical region where it fits with the downstream seat 4".

Figure 2:
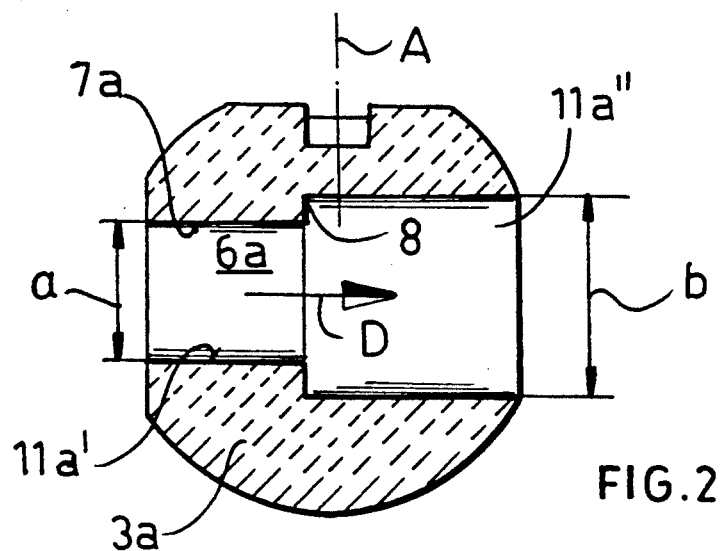
FIGS. 2 through 5 are large-scale views of different valve balls according to this invention.

FIG. 2 shows a monolithic sintered-ceramic valve element 3a having a passage 6a with a wall 7a formed with a cylindrical upstream portion 11a' of a small diameter a separated at a step 8 from a downstream portion 11a" of a large diameter b. The step 8 is somewhat upstream of the axis A.

Figure 3:
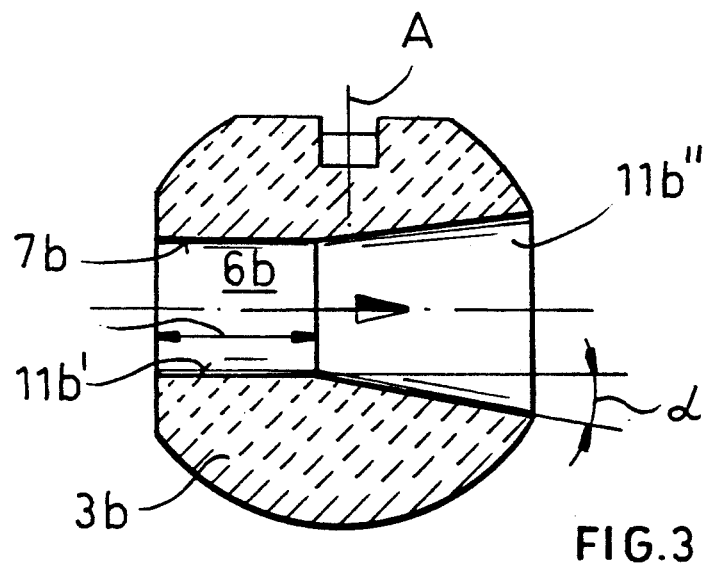

In FIG. 3 another one-piece sintered-ceramic valve body 3b has a passage with an inner wall 6b with a cylindrical small-diameter upstream portion 11b' and a frustoconical downstream portion 11b" with a flare angle $\alpha$. The upstream end of the downstream portion 11b" here also is upstream of the axis A.

Figure 4:
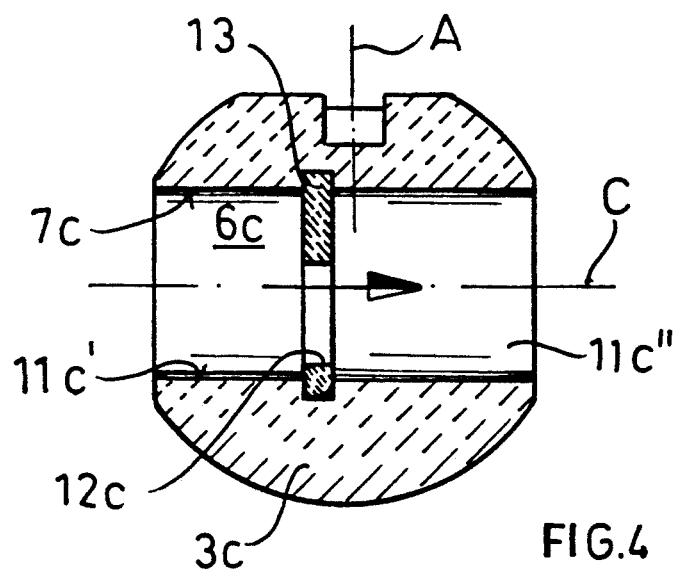

In FIG. 4 a valve element 3c has a passage wall 7c with upstream and downstream portions 11c' and 11c" that are of identical cylindrical shape and size. Between these portions 11c' and 11c" slightly upstream of the axis A is an insert washer 13 formed with a small-diameter orifice 12c of circular shape that is offcenter to the line C. This washer 13 is formed of a wear-resistant material.

Figure 5:
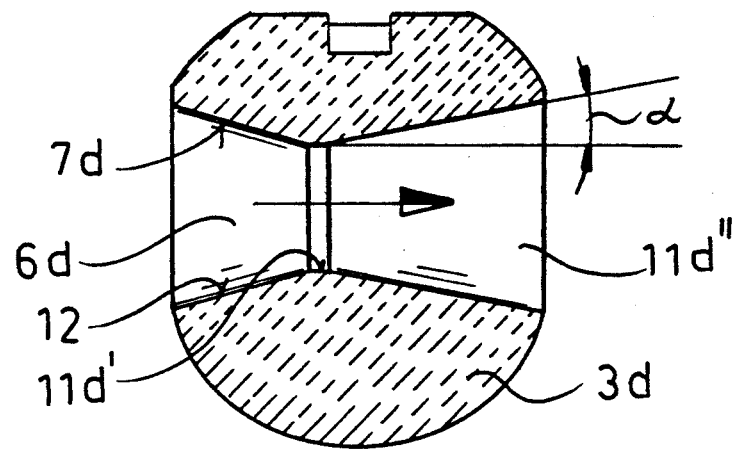

The system of FIG. 5 has a valve body 3d whose passage 6d has a wall 7d with frustoconical upstream and downstream portions 11d' and 11d" as in FIG. 6, but here the body 3d is of a single unitary piece of sintered ceramic.

I claim:

1. In a throttle-type metering valve having:
   a housing having an inlet connection and an outlet connection and formed with a valve seat having spaced inlet and outlet ports connected to the respective connections; and
   a valve ball formed with a throughgoing passage having an inner wall of a wear-resistant material and having an upstream end and a downstream end, the ball fitting in the seat and being displaceable therein between an open position with its passage aligned between the respective inlet and outlet ports and a closed position with its passage out of alignment between the ports,
   the improvement wherein
      the passage is formed centrally between its downstream end and its upstream end as a restriction,
      the flow cross section of the passage is uniform downstream and upstream of the restriction, and
      the passage is of larger flow cross section at its downstream end than at the restriction and upstream thereof, whereby on fluid flow through the valve from the inlet to the outlet flow separation from the wall is initiated at the restriction.

2. The ball valve defined in claim 1 wherein the valve ball is provided with a sintered-ceramic liner forming the passage and with a retaining ring at the downstream end holding the liner in place in the ball.

3. The ball valve defined in claim 1 wherein the passage is formed with a step constituting the restriction.

4. In a throttle-type metering valve having:
   a housing having an inlet connection and an outlet connection aligned along a longitudinal centerline and formed with a valve seat having spaced inlet and outlet ports connected to the respective connections; and
   a valve ball formed with a throughgoing passage having an inner wall of a wear-resistant material and having an upstream end and a downstream end, the ball fitting int he seat and being rotatable therein about an axis perpendicular to and intersecting the centerline between an open position with its passage aligned between the respective inlet and outlet ports and a closed position with its passage out of alignment between the ports,
   the improvement wherein
      the passage is formed centrally between its downstream end and its upstream end as a restriction,
      the flow cross section of the passage is uniform downstream and upstream of the restriction, and
      the passage is of larger flow cross section at its downstream end than at the restriction and upstream thereof, whereby on fluid flow through the valve from the inlet to the outlet flow separation from the wall is initiated at the restriction.

5. In a throttle-type metering valve having:
   a housing having an inlet connection and an outlet connection and formed with a valve seat having spaced inlet and outlet ports connected to the respective connections; and
   a valve ball formed with a throughgoing passage having an inner wall of a wear-resistant material and having an upstream end and a downstream end, the ball fitting in the seat and being displaceable therein between an open position with its passage aligned between the respective inlet and outlet ports and a closed position with its passage out of alignment between the ports,
   the improvement wherein
      the passage is formed centrally between its downstream end and its upstream end as a restriction, and
      the passage is of larger flow cross section at its downstream end than at the restriction and upstream thereof, whereby on fluid flow through the valve from the inlet to the outlet flow separation from the wall is initiated at the restriction.

* * * * *